June 24, 1958
T. H. CLARK
2,840,813
RADIO DIRECTION FINDER
Filed March 20, 1947
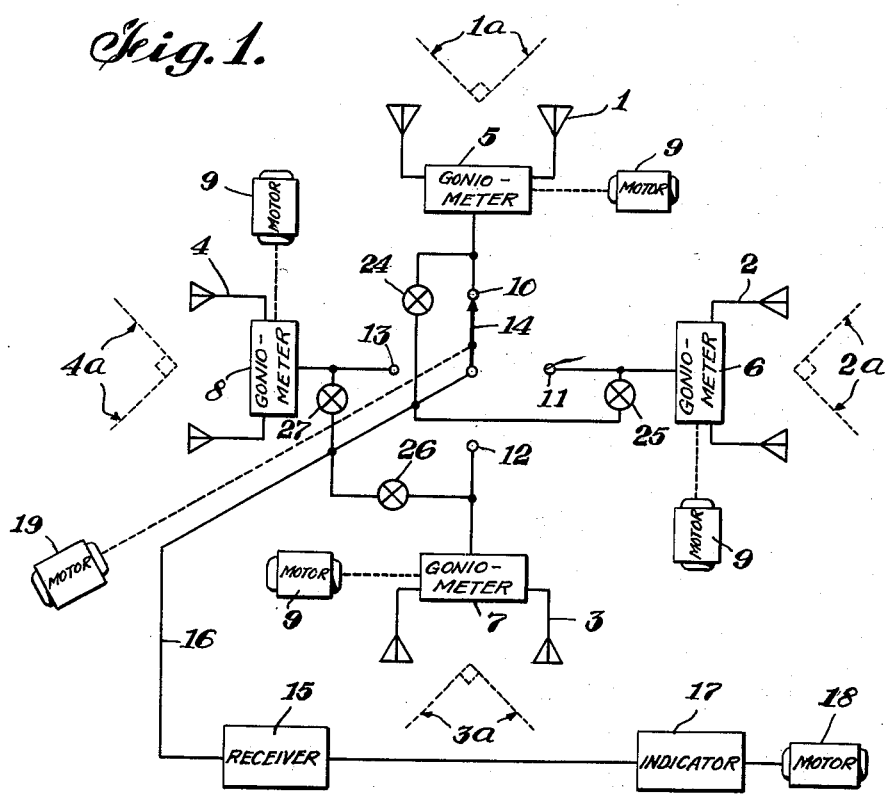
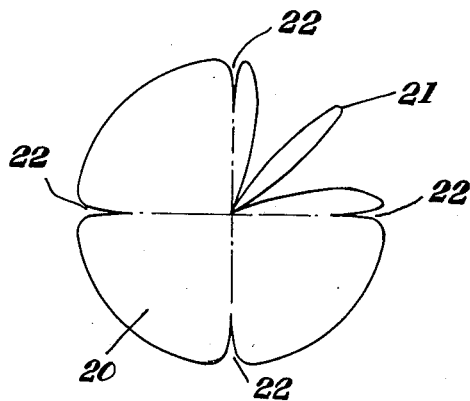
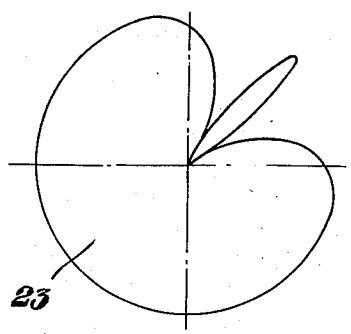
INVENTOR.
TREVOR H. CLARK
BY
*R P Morris*
ATTORNEY

United States Patent Office 2,840,813
Patented June 24, 1958

2,840,813
RADIO DIRECTION FINDER

Trevor H. Clark, Boonton, N. J., assignor to International Telephone and Telegraph Corporation, a corporation of Maryland Application March 20, 1947, Serial No. 735,955

9 Claims. (Cl. 343—120)

This invention relates to direction finders, and more particularly to methods and apparatus for coupling a direction finder indicator to selected antennas where the complete rotation of a single directive pattern is not feasible.

In the prior art, direction finding systems have been disclosed which utilize a plurality of separate directive antennas arranged to sweep contiguous angles of a 360° arc. The systems disclosed provide switching means in synchronism with the antenna sweeps for connecting the oscilloscope sweep periodically to the antenna system.

One object of my invention is to provide coupling means, similar to that outlined above but operating to trace or sweep each angle a plurality of times intermediate each angle switching.

Another object of my invention is to provide a plural sector sweeping antenna system having switching means, operating at a slower speed than the antenna system and indicator sweeps, for coupling the indicator to the antenna system.

Another object of my invention is to provide switching means for coupling the antenna system for a predetermined directive sector to the indicator at the will of the operator.

Another object of this invention is to provide switching means for connecting a selected antenna sweep quadrant to the indicator for a continuous period of time.

While my invention itself it defined in the appended claims, the invention, together with other and further objects and features thereof, will be best understood from the following description of an embodiment thereof, reference being had to the drawings in which:

Figure 1 shows a block digram of a quadrant switching system operating at random with respect to the antenna and indicator sweeps incorporating the features of my invention;

Figure 2 shows the undesirable effects produced in an indicator pattern by previous switching means on a reception pattern;

Figure 3 shows a desired reception indicator pattern as received by the apparatus of Figure 1.

Figure 1 shows four directive antennas—1, 2, 3, and 4—these antennas each being controlled to sweep the directive action through substantially 90° as indicated at 1a, 2a, 3a, and 4a. These antennas are coupled to goniometers 5, 6, 7, and 8 which are controlled by driving means, preferably synchronous motors 9 to perform the desired directive sweeping action. The output of each of the goniometers is coupled to switching contacts 10, 11, 12, and 13. The quadrant switch 14 picks off the desired received signals and applies them to a radio receiver 15 through connection 16. The output of receiver 15 is coupled to a direction finder indicator, such as the cathode ray oscilloscope 17 having a sweep circuit controlled by a motor 18 synchronized with the motors 9.

A driving motor 19 serves to drive switch 14 into contact successively with switch contacts 10, 11, 12, and 13.

In direction finders of this general type, previously proposed motor 19 operates switch 14 in synchronism with other motors of the system to produce a pattern 20 similar to that shown in Figure 2.

The shape of the oscilloscope pattern 20 is obtained by having a full circle described on the screen of the oscilloscope when no signal is coming from the quadrant which is being contacted. Upon the receipt of a signal, an inward deflection is produced. At the null position, an outward deflection is again produced as at 21 in Figure 2. In this pattern, distortion occurs at each of the points 22 corresponding to the quadrant switching positions due to the switching of the beam from one of the contacts 10, 11, 12, and 13 to the next succeeding contact. Such distortions occur unless perfect synchronization and instantaneous switching is achieved. This distortion sometimes may be of sufficient magnitude to obscure the directional indication node 21, particularly when the node is in line with one of the quadrant switching positions.

The present system provides a smooth pattern 23 as shown in Figure 3. This is accomplished by moving switch 10 at a speed lower than and preferably out of instantaneous angular positions with motors 9 and 18. For example, if motors 9 and 18 rotate at 1800 R. P. M., motor 19 may be as low as 100 to 300 R. P. M., thus producing anywhere from 6 to 18 traces in each quadrant before being switched to the next quadrant. Since switch 14 switches from one contact to another, say only after a plurality of traces in the quadrant, and the switching produces only one fine line on the face of the scope compared to 10 superimposed lines for the pattern, this fine line is not visually distinguishable and therefore does not distort or reduce the intelligence of the pattern. Furthermore, the switching of 14 may occur at any position within the quadrant and need not necessarily recur repeatedly in the same place. In order that the effects of the single line switching trace may be further reduced, it is preferable that the sector switching speed be other than a sub-multiple of the sector scanning frequency so that the switching will occur at different points in the trace upon successive scans. The switching speed, while lower than the sweep scanning, may be random, if desired. Switch 14 may be manual, if desired, so that any quadrant may be selectively scanned at the will of the operator.

In order to make the stopping of the operation of the sector switch on a particular quadrant for selective exploration of the sector unnecessary, by-passing switches 24, 25, 26, and 27 are provided as shown in Figure 1 around each quadrant of the quadrant switch. Such a system might be controlled by pushbuttons on the control equipment so that any sector could be selected for one sector operation. This would short across that particular sector of the sector switch, and thus obtain all the advantages which might be obtained by stopping the switch on one quadrant, while at the same time securing the advantages of repeated sweeps also. If it is found more desirable to receive no energy from the quadrants other than that desired, the switch may be arranged to cut out the input to the other sectors of the switch at the same time the desired sector was connected to the received.

While I have described above the principles of my invention in connection with specific apparatus, it is to be clearly understood that this description is made only by way of example and not as a limitation on the scope of my invention.

What is claimed is:

1. A direction finder for indicating the direction of transmitting stations within a given arc, comprising means for producng a plurality of directive radiant energy receiving patterns, means for sweeping the directive effect of said patterns successively through given contiguous angular portions to define together said given arc, indication means for producing in synchronism with the respective sweeps of said patterns through said angular portions an indication corresponding to respective angular portions of said arc, means for applying received energy to said indicator means from said directive patterns at a lower frequency, with respect to the frequency of the sweep of each angular portion indication to define the directive position of transmitting stations within said arc.

2. A system according to claim 1, wherein said lower frequency is made to be other than an integral sub-multiple of the frequency of the angular portion indication.

3. A direction finder for indicating the direction of transmitting stations within a given arc, comprising means for producing a plurality of directive radiant energy receiving patterns, means for sweeping the directive effect of said patterns successively through given contiguous angular portions at a given frequency to define together said given arc, a trace indicator, means for producing in synchronism with the respective sweep of said patterns through said angles an indicator trace corresponding to respective angular portions of said arc, and means for successively applying received energy to said indicator from the directive patterns at a substantially lower frequency than the frequency of the antenna sweep, whereby the resultant indicator trace produces a brighter direction indicating trace than switching trace.

4. A direction finder for indicating the direction of transmitting stations within a given arc, comprising means for producing a plurality of directive radiant energy receiving patterns, comprising an antenna system, a radio goniometer for sweeping the directive effect of said patterns successively through given contiguous angular portions at a given frequency to define together said given arc, an oscilloscope, means for producing in synchronism with the respective sweeps of said patterns through said angles an oscilloscope trace corresponding to respective angular portions of said arc, and means for successively applying received energy to said oscilloscope from the directive patterns at a substantially lower frequency than the frequency of the antenna sweep, whereby the resultant oscilloscope sweeps trace produces a brighter direction indicating trace than switching trace.

5. A direction finder system for indicating the direction of transmitting stations within a given arc, comprising directive antennas arranged about a given point, each having its directive action outwardly from said point, individual control means for controlling the directive action of each of said antennas to sweep it thru given contiguous angles to define together said given arc comprising first driving means mechanically coupled to each of said antennas and being synchronized, an oscilloscope, means for producing in synchronism with the respective sweeps of said antennas through said angles an oscilloscope trace corresponding to respective angular portions of said arc, a switching circuit for successively coupling said antennas to said oscilloscope, comprising a rotating quadrant switch to effect switching at a frequency lower than the frequency of said antenna sweep and said indicator trace.

6. A direction finder system comprising a plurality of antennas, arranged to produce a desired radiation pattern, control means for sweeping said patterns through predetermined angles, bearing indicator means, means for coupling said antennas to said indicator means comprising switching contacts coupled to each of said antennas, and a rotating quadrant switch coupled to said indicator means for engaging said switching contacts, means for rotating said quadrant switch at a frequency lower than said pattern sweeps, and separate bypass switches coupled between each of said switching contacts and said quadrant switch for effectively selecting a single sector for indication while maintaining the normal successive switch operation.

7. A direction finder system comprising a plurality of antennas arranged to produce a desired radiation pattern, control means for sweeping said pattern through predetermined angles comprising first driving means coupled to said antennas, bearing indicator means, means for coupling said antennas to said indicator means comprising switching contacts coupled to each of said antennas, and a rotating quadrant switch coupled to said indicator means for engaging said switching contacts, means for rotating said quadrant switch at a frequency lower than the frequency of said antenna sweeps comprising second driving means, and individual by-pass switches coupled between each of said switching contacts and said quadrant switch, whereby single sector and successive sector switching is obtained.

8. A direction finder system for indicating the direction of transmitting stations within a given arc, comprising directive antennas arranged about a given point, each having its directive action outwardly from said point, individual control means for controlling the directive action of each of said antennas to sweep it through given contiguous angular portions to define together said given arc, means for producing in synchronism with the respective sweeps of said antennas through said angular portions an indication corresponding to respective angular portions of said arc, a switching circuit for successively coupling said antennas to said indicator comprising a rotating quadrant switch, said quadrant switch mechanically coupled to driving means, said driving means operating to effect switching at a frequency lower than the frequency of said antenna sweep and said angular portion indications.

9. A direction finder system for indicating the direction of transmitting stations within a given arc, comprising four directive antennas arranged about a given point each having its directive action outwardly from said point, individual control means for controlling the directive action of each of said antennas to sweep it through an angle of 90° whereby said antennas cover a resultant 360° arc sweep about said point, comprising separate synchronized driving means coupled to each of said antennas, an oscilloscope for producing in synchronism with the respective sweeps of said antennas through said angles an oscilloscope trace corresponding to respective angular positions of said arc, a switching circuit for successively coupling said antennas to said indicator at a substantially lower frequency with respect to the frequency of said antenna sweep and said oscilloscope sweep comprising a rotating quadrant switch, said switch mechanically coupled to non-synchronized driving means operating to effect switching at a frequency lower than the frequency of said antenna sweep and said oscilloscope sweep.

References Cited in the file of this patent

UNITED STATES PATENTS

| | | |
|---|---|---|
| 2,206,637 | Koch | July 2, 1940 |
| 2,263,377 | Busignies et al. | Nov. 18, 1941 |
| 2,408,039 | Busignies | Sept. 24, 1946 |